(12) United States Patent
Heldt et al.

(10) Patent No.: US 9,375,746 B2
(45) Date of Patent: Jun. 28, 2016

(54) COMPACT PAINT BOOTH

(75) Inventors: Robert Heldt, Oxford, MI (US); Jan Grigoleit, Bietigheim-Bissingen (DE); Vassilios Sougioltzis, Bietigheim-Bissingen (DE); Thomas A. Bucknell, White Lake, MI (US)

(73) Assignee: Durr Systems GmbH, Stuttgart (DE)

( * ) Notice: Subject to any disclaimer, the term of this patent is extended or adjusted under 35 U.S.C. 154(b) by 712 days.

(21) Appl. No.: 12/478,510

(22) Filed: Jun. 4, 2009

(65) Prior Publication Data

US 2009/0304940 A1 Dec. 10, 2009

Related U.S. Application Data

(60) Provisional application No. 61/059,170, filed on Jun. 5, 2008, provisional application No. 61/059,555, filed on Jun. 6, 2008.

(51) Int. Cl.
*B05B 7/06* (2006.01)
*B05C 11/00* (2006.01)
(Continued)

(52) U.S. Cl.
CPC ......... *B05B 15/1207* (2013.01); *B05B 13/0431* (2013.01); *B05B 13/0452* (2013.01); *B25J 5/02* (2013.01); *B25J 9/0084* (2013.01); *B25J 9/0093* (2013.01); *B05B 12/14* (2013.01);
(Continued)

(58) Field of Classification Search
CPC ......... Y10S 55/46; B05C 15/00; B05B 15/12; B05B 15/1207; B05B 15/1211; B05B 12/14; B05B 13/0431; B05B 13/0452; B05B 13/0292; B05B 15/025; B05B 13/02; B05B 13/04; B25J 5/00; B25J 5/02

USPC ............... 118/314, 315, 629, 698; 427/421.1, 427/470, 471, 472.2; 55/DIG. 46; 901/43; 239/695, 265.25; 198/341.08; 454/50
See application file for complete search history.

(56) References Cited

U.S. PATENT DOCUMENTS 3,619,311 A * 11/1971 Rose et al. ................. 156/62
3,709,190 A * 1/1973 Von Gottberg ..... B05B 13/0452
118/323

(Continued)

FOREIGN PATENT DOCUMENTS

| CN | 1874848 A | 12/2006 |
|---|---|---|
| EP | 1567280 A1 | 8/2005 |

(Continued)

OTHER PUBLICATIONS

International Search Report from PCT/EP2009/004062 dated Sep. 23, 2009.

(Continued)

*Primary Examiner* — Karl Kurple
(74) *Attorney, Agent, or Firm* — Bejin Bieneman PLC

(57) ABSTRACT

Paint booths for applying paint to an object, as well as methods for degrading coating operations associated with a paint booth, are disclosed. Paint booth may generally include one or more robot rails positioned parallel to the path of the conveyor, and one or more robots positioned on at least one of the rails. Robots may be configured to simultaneously apply a first paint layer to the interior and exterior surfaces of the object. Paint booths may further include one or more additional robots positioned on at least one of the rails and configured to simultaneously apply a second paint layer to the interior and exterior surfaces of the object.

19 Claims, 7 Drawing Sheets

(51) Int. Cl.
*B05B 15/12* (2006.01)
*B05B 13/04* (2006.01)
*B25J 5/02* (2006.01)
*B25J 9/00* (2006.01)
B05D 1/34 (2006.01)
B05D 5/10 (2006.01)
B05C 11/10 (2006.01)
B05C 13/02 (2006.01)
B05B 12/14 (2006.01)
B05B 15/02 (2006.01)

(52) U.S. Cl.
CPC .......... *B05B 15/025* (2013.01); *B05C 11/1015* (2013.01); *B05C 13/02* (2013.01)

(56) References Cited

U.S. PATENT DOCUMENTS

| | | | | |
|---|---|---|---|---|
| 3,782,036 A * | 1/1974 | Clark | ..................... | B60J 5/0412 49/502 |
| 3,921,576 A * | 11/1975 | Vertue | ................... | B05B 15/124 118/326 |
| 4,239,431 A * | 12/1980 | Davini | .............................. | 414/1 |
| 4,498,414 A * | 2/1985 | Kiba et al. | ..................... | 118/663 |
| 4,503,507 A * | 3/1985 | Takeda et al. | ................. | 700/249 |
| 4,532,148 A * | 7/1985 | Vecellio | ..................... | B05B 5/04 118/323 |
| 4,539,932 A * | 9/1985 | Vecellio | ..................... | B05B 5/04 118/622 |
| 4,613,943 A * | 9/1986 | Miyake et al. | ................. | 700/251 |
| 4,630,567 A * | 12/1986 | Bambousek | ........ | B05B 13/0431 118/323 |
| 4,704,298 A * | 11/1987 | Herman | .................. | B05B 7/226 118/302 |
| 4,714,044 A * | 12/1987 | Kikuchi | ............. | B05B 13/0452 118/314 |
| 4,768,462 A * | 9/1988 | Kuronaga et al. | ............. | 118/315 |
| 4,841,431 A * | 6/1989 | Takagi et al. | .................... | 700/82 |
| 4,869,935 A * | 9/1989 | Hayashi | .................... | B05C 9/08 118/314 |
| 4,931,322 A * | 6/1990 | Yamamoto | ............. | B05B 12/122 118/315 |
| 5,014,644 A * | 5/1991 | Yamamoto | .......... | B05B 13/0292 118/314 |
| 5,100,442 A * | 3/1992 | Gore et al. | ...................... | 96/323 |
| 5,127,363 A * | 7/1992 | Nakamura | .......... | B05B 15/025 118/302 |
| 5,161,936 A * | 11/1992 | Kato | ............................. | 414/728 |
| 5,204,942 A * | 4/1993 | Otera et al. | ................... | 700/248 |
| 5,768,627 A * | 6/1998 | Jones et al. | ..................... | 710/60 |
| 5,989,643 A * | 11/1999 | Nakagawa et al. | ........... | 427/424 |
| 6,613,147 B1 * | 9/2003 | Nieto | .................. | B05B 13/0207 118/305 |
| 6,716,272 B2 * | 4/2004 | Klobucar et al. | ................ | 95/216 |
| 6,910,254 B2 * | 6/2005 | Aoki | ...................... | B62D 25/04 29/281.1 |
| 7,429,298 B2 * | 9/2008 | Krogedal et al. | ............. | 118/323 |
| 7,622,158 B2 * | 11/2009 | Clifford | ................ | B05B 12/149 118/314 |
| 7,798,094 B2 * | 9/2010 | Meissner | ...................... | 118/305 |
| 8,359,997 B2 * | 1/2013 | Vandepitte | .......... | B05B 13/0452 118/309 |
| 2004/0107900 A1* | 6/2004 | Clifford | .............. | B05B 13/0452 118/305 |
| 2005/0181142 A1 | 8/2005 | Hirano et al. | | |
| 2005/0256610 A1 | 11/2005 | Orita | | |
| 2006/0040060 A1* | 2/2006 | Meissner | ...................... | 427/289 |
| 2007/0134429 A1* | 6/2007 | Kenmoku | ............. | B05B 12/084 427/421.1 |
| 2008/0060575 A1* | 3/2008 | Meissner | ...................... | 118/313 |
| 2009/0320753 A1* | 12/2009 | Yoshino et al. | ............... | 118/315 |
| 2012/0171383 A1* | 7/2012 | Christensen | ........ | B05B 13/0426 427/427.3 |
| 2012/0304924 A1* | 12/2012 | Fernholz | ............. | B05B 13/0221 118/500 |
| 2013/0071573 A1* | 3/2013 | Brewer | ................. | B05B 13/005 427/421.1 |
| 2014/0220249 A1* | 8/2014 | Rouaud | ................... | B05B 12/02 427/256 |

FOREIGN PATENT DOCUMENTS

| | | | |
|---|---|---|---|
| EP | 1609532 A1 | 12/2005 | |
| JP | 04-063164 | 2/1992 | |
| JP | 04-074557 | 3/1992 | |
| JP | 05265535 A | 10/1993 | |
| JP | 2504961 B2 | 6/1996 | |
| JP | 2001-205184 | 7/2001 | |
| JP | 200393966 | * 2/2003 | ............... B05D 7/14 |
| JP | 2003-093986 | 4/2003 | |
| SU | 959840 A | 9/1982 | |
| SU | 1595577 A1 | 9/1990 | |
| WO | WO-2007/131660 A1 | 11/2007 | |

OTHER PUBLICATIONS

Written opinion of the International Searching Authority for PCT/EP2009/004062.
Russian Decision to Grant Patent (with translation) for Application No. 2010154291/05(078553) filed on Jun. 5, 2009; Dated Dec. 24, 2012 (10 pages).
Russian Decision to Grant Patent.

* cited by examiner

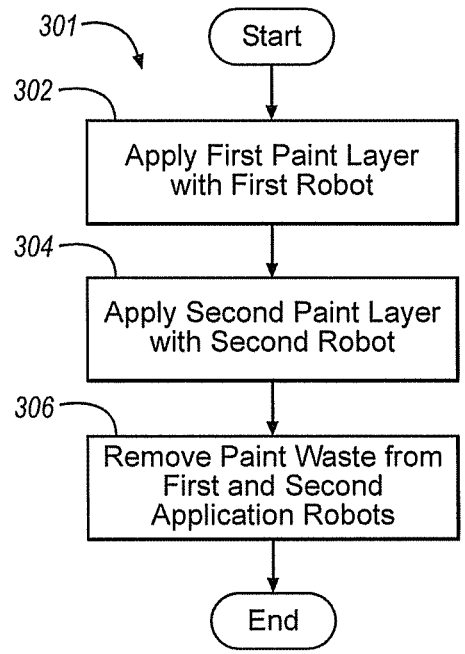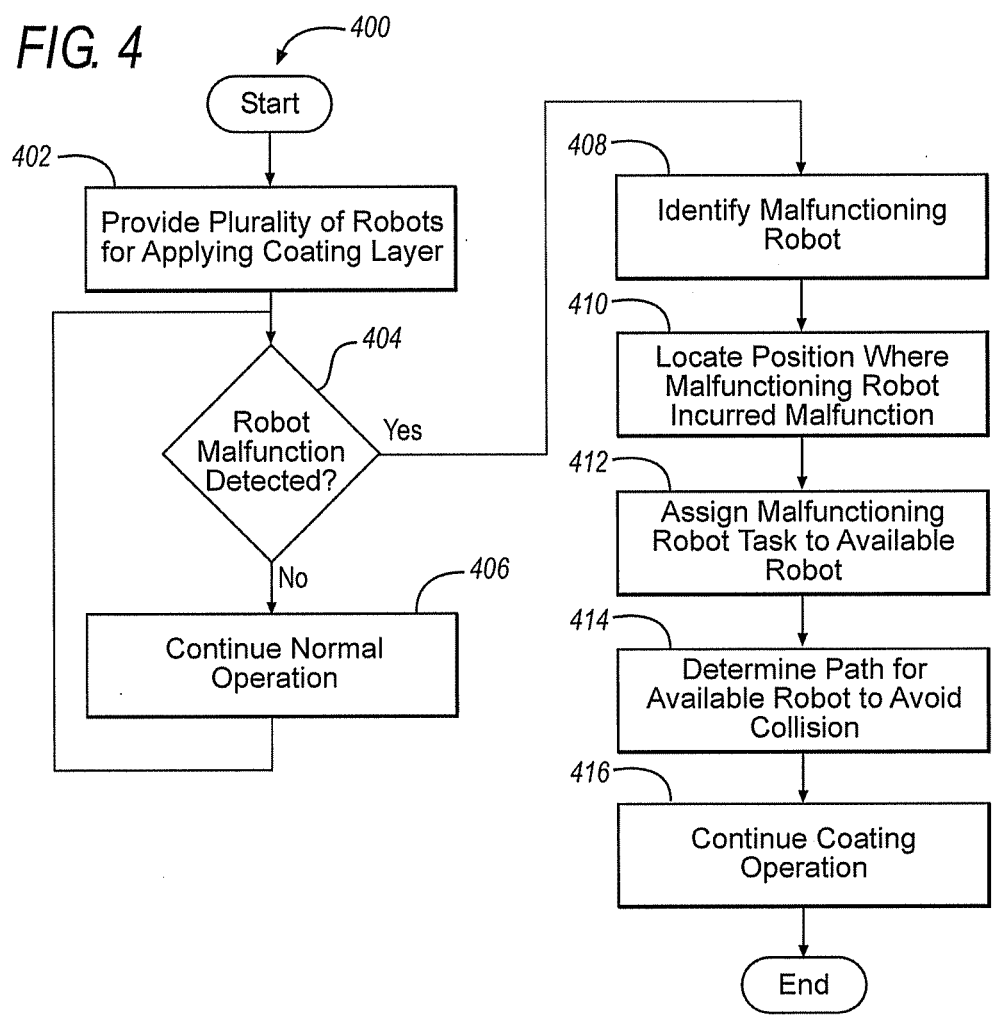

COMPACT PAINT BOOTH

CROSS-REFERENCE TO RELATED APPLICATIONS

The present application claims priority from U.S. Provisional Patent Application Ser. Nos. 61/059,170 and 61/059,555, which were filed on Jun. 5, 2008 and Jun. 6, 2008, respectively. The contents of each are expressly incorporated herein by reference in their entireties.

BACKGROUND

Painting or coating applications for motor vehicle applications generally entail large, expensive installations within a vehicle assembly plant. Ongoing efforts to reduce costs and increase plant efficiencies have led to a desire for increasingly smaller coating plants, as smaller coating installations generally consume less energy during operation than larger installations. Further, smaller coating installations offer increased installation flexibility and greater utilization rates of plant floor space.

Quality and environmental concerns generally require large coating installations having separate booths for application of different coating layers, e.g., an exterior paint layer and interior paint layer. For example, generally an interior paint booth and an exterior paint booth are provided separately along a coating installation line. The separate interior and exterior booths are provided in order to ensure that application of different coating layers, minimize overspray of coating materials, especially where different materials are applied in different layers. Therefore traditionally the interior and exterior booths are separated from one another, and include separate support systems such as coating waste disposal mechanisms, manual backup zones for application robots, etc.

Accordingly, there is a need for a coating installation that allows for application of different coating layers and/or different coating materials within a reduced footprint as compared with traditional coating installations having separate booths.

BRIEF DESCRIPTION OF THE DRAWINGS

Referring now to the drawings, exemplary illustrations are shown in detail. Although the drawings represent some examples, the drawings are not necessarily to scale and certain features may be exaggerated, removed, or partially sectioned to better illustrate and explain the present invention. Further, the exemplary illustrations set forth herein are not intended to be exhaustive or otherwise limit or restrict the claims to the precise forms and configurations shown in the drawings and disclosed in the following detailed description:

FIG. 3 is a process flow diagram for an exemplary process for applying a coating material to an object; and FIG. 4 is a process flow diagram for an exemplary process for degrading a coating installation.

DETAILED DESCRIPTION

Various exemplary illustrations of a coating installation, methods of applying a coating material to an object, and methods of degrading a coating installation, i.e., reassigning application robot tasks during a malfunction of one of the robots, are disclosed herein. Examples of coating installations provided herein generally include paint booths in a vehicle assembly plant, but a wide variety of other applications are also possible.

Generally, a coating installation or paint booth may be provided for applying coating materials such as primer and base coat paint where coating robots are applying coating materials simultaneously to interior and exterior surfaces of a vehicle body. The exemplary coating installation includes a first section where coating robots positioned on high and low rails simultaneously apply a primer coat to a vehicle body both to the body's interior and exterior surfaces. A second section may also be possible where a base coat paint material is simultaneously applied to both the interior and exterior surfaces of the vehicle body. As described in the exemplary embodiment the coating robots may in some circumstances include an appendage configured to allow a coating robot to selectively operate as an opener robot. By allowing a coating robot to selectively operate as an opener robot the total number of robots in a paint booth may be reduced.

The coating installation may further include a scrubber for paint application waste disposal. The paint application waste disposal defines a predetermined length encompassing each of the coating robots in the paint booth.

Additionally, a method of painting an object, e.g., a motor vehicle body, in a paint booth is disclosed. Exemplary methods may include simultaneously applying a first paint layer to first and second portions of the object, for example interior and exterior surfaces of the object followed by simultaneously applying a second paint layer to the first and second portions of the object.

Methods for degrading a coating installation are also disclosed. An exemplary method generally includes a process for selecting a replacement robot, or robot to carry out tasks previously assigned to a robot that has failed (either in part or completely) These tasks may be prioritized; for example replacement robots may paint the exterior of the car ahead of the engine compartment and the engine compartment ahead of door jams. In this way tasks that are highly visible or labor intensive are done on a priority basis. The method, for example, may allow a robot that was previously assigned to paint a door jam to be reassigned to painting the exterior of the car if a coating robot assigned to the exterior of the car is not available. This method may be further enhanced where the coating robots are configured to also act as opener robots insofar as coating robots may step in and perform opening operations if a robot assigned the task of opening is not available.

Figure 1A:
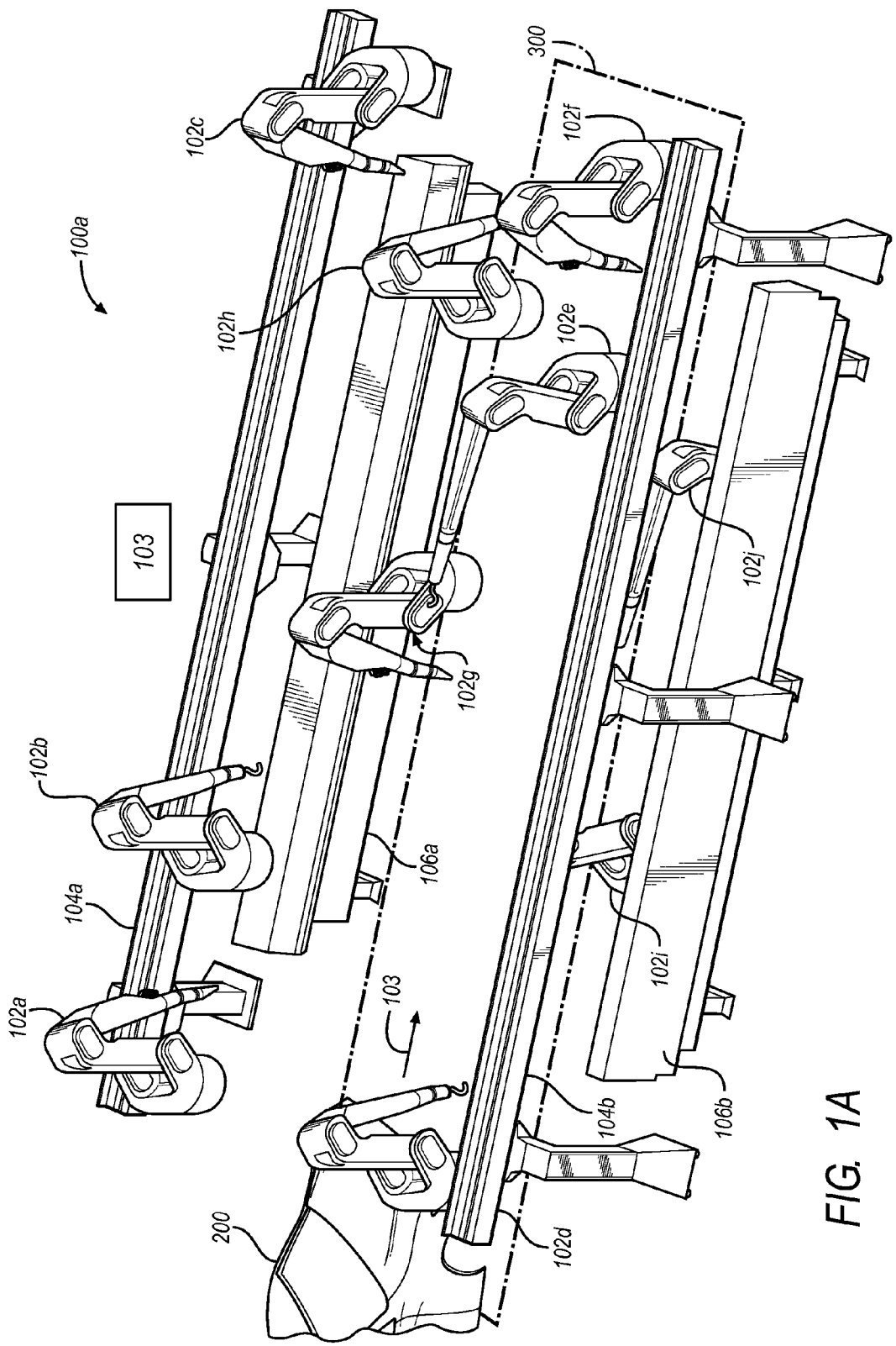
FIG. 1A is an isometric view of an exemplary coating installation.
Figure 1B:
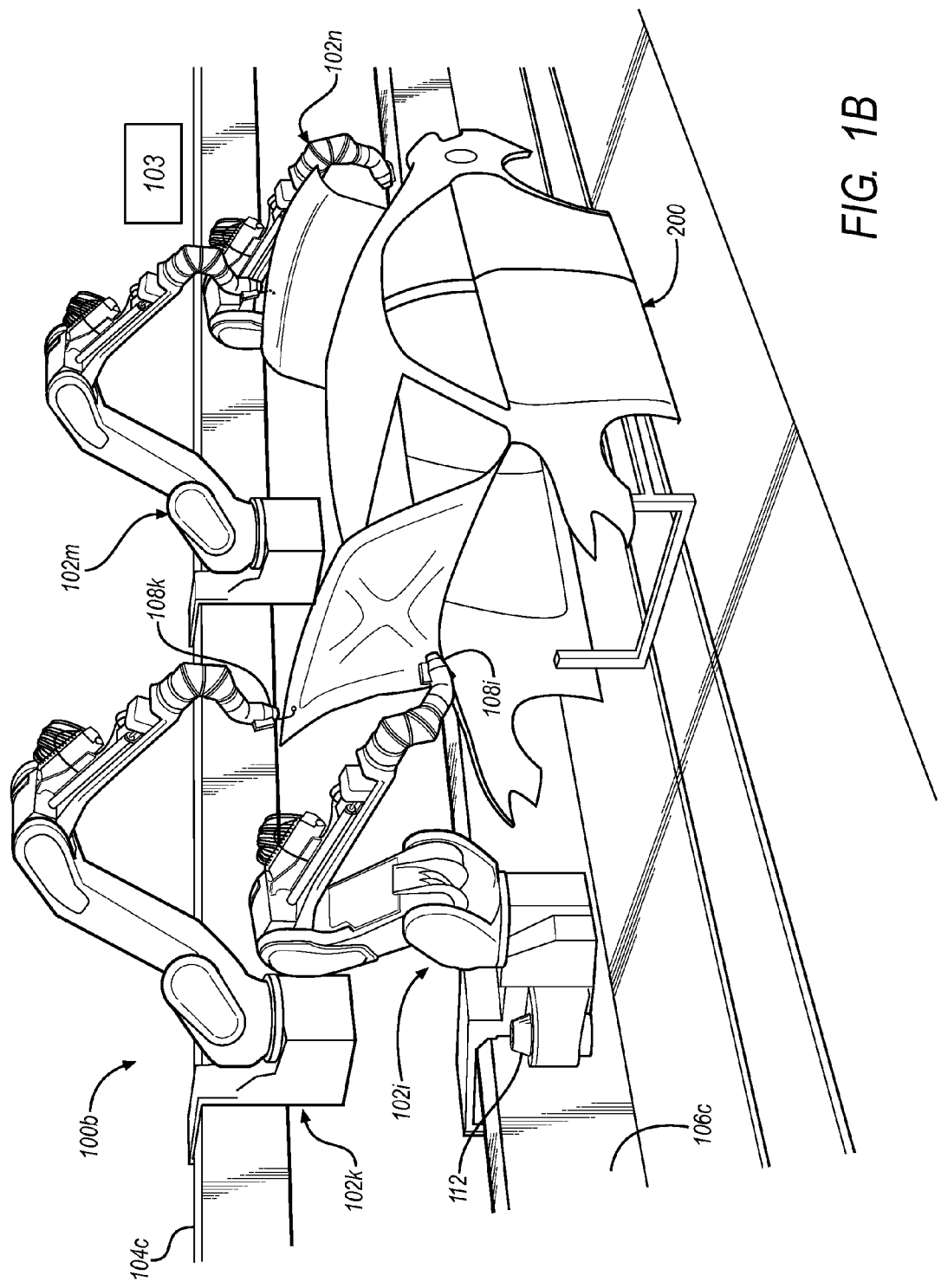
FIG. 1B is an isometric view of another exemplary coating installation.

Turning now to FIGS. 1A-1D, exemplary coating installations or paint booths 100 are described in further detail. FIGS. 1A and 1B illustrate an exemplary in line coating operation where a vehicle body 200 continuously moves through the paint booth. As body 200 moves through the booth, a plurality of robots 102a, b, c, d, e, f, g, h, i, j (collectively, 102) operate to coat the vehicle, both on its interior and exterior surfaces. Robots 102 may include any coating application robot that is convenient, for example multi-axis robots, e.g., 6-axis or 7-axis robots that are capable of various kinematics or movements that allow the robots to perform spraying and/or handling operations associated with a painting operation. Robots 102 may also apply different types of materials, for example primer and base coat, to body 200 to affect a complete coating/painting operation. As shown, a rail system including upper rails 104 and lower rails 106 is provided for the mounting of the robots 102. Specifically, upper rails 104*a, b* (collectively, 104) may support six (6) of the robots 102*a, b, c, d, e*, and *f* for movement in a generally longitudinal direction that is generally parallel to the path of body 200. It is understood that fewer than six robots may be used and the number of robots within paint booth 100 may be fewer.

As shown, robots 102*a, b, d, g* and *j* may operate to coat body 200 with a first coating material such as a primer on both the body's interior and exterior surfaces. Thereafter, as vehicle body 200 progresses through the booth in the direction of arrow 103 and robots 102 *g, j, e, f* and *c* may operate to coat body 200 with a second coating material, for example a tinted basecoat. As described in more detail below, robots 102 may be configured to operate both as painting robots and as opener robots. Further, when the base coat is being applied, another vehicle body (not shown) may receive a primer coat within the booth 100*a*.

The application robots 102 illustrated in FIG. 1 are generally are configured to apply coating materials to the body 200 as it moves through the paint booth in the direction 103. The robots 102 may each be provided with an atomizer 108 that is configured to apply a paint material to a vehicle body. For example, various atomizers are generally provided in U.S. Pat. Nos. 6,189,804, 6,360,962, and 6,623,561, each of which are hereby expressly incorporated by reference in their entireties.

The atomizer may also be capable of applying different materials to the object 200, even in succession. For example, the atomizer 108 is capable, if necessary, of applying a first coating material, such as to one portion of a vehicle 200, for example a primer coat to the exterior, and then subsequently applying a second coating material, such as to another portion of the vehicle 200, for example a base coat to an exterior surface. Various examples of such atomizers are also provided by U.S. patent application Ser. No. 12/300,741, which is the United States National Stage application of WO 2007/131636, each of which are hereby expressly incorporated by reference in their entireties. Accordingly, the atomizer 108 may apply a second coating material without mixing any of the prior coating material that may remain in the atomizer 108 after its application. Thus, the robots 102 may apply different coating materials, e.g., paint, within the same paint booth 100*a* to the body 200. The robots 102 may even be individually capable of applying different coating materials in succession; for example a given robot 102 may apply a primer, base coat, and clear coat to a given vehicle or object.

As part of this capability, the atomizer 108 may include a cleaning feature. For example, as best seen in FIG. 1B, robot 102*l* has an associated cleaning wash bowl 112. The cleaning wash bowl 112 allows for insertion of the atomizer 108 into the bowl 112 for cycling a cleaning fluid throughout the atomizer 108, thereby generally entirely removing traces of a coating material left within the atomizer 108 after application.

The various robots 102 may be controlled by a central motion controller 500 associated with the paint booth. For example, a motion controller 500 may be provided that generally provides instructions to the robots 102 regarding movement during a coating operation. It is understood that these instructions may be input based on the specifics of vehicle body 200. Further, a controller 500 may also include a computer-readable medium that includes instructions executable for performing various tasks as part of the processes and method discussed herein.

As described above, the booth 100*a* includes a rail system including upper rails 104 and lower rails 106 that generally allow selective placement of the robots 102 at various positions within the booth 100*a* for application of a coating layer and/or other functions e.g., opening a closure panel of a vehicle. Each of the upper and lower rails 104, 106 generally extend in a direction parallel to a path defined by the object to be coated as the object moves through the paint booth. Each of the robots may thus be secured to its respective rail 104 or 106 for movement along the rail.

The robots may be generally grouped for application of various different coating materials, such as paint. In another example, robots 102*a*, 102*d*, and 102*i* may cooperate to apply a first primer coat to both the interior and exterior portion of the body 200. Further, robots 102*b* 102*g* and 102*j* may be grouped together to apply a primer coat of paint to both underhood (interior) and deck areas (exterior) of the body 200. Each of robots 102*c*, 102*e*, 102*f*, and 102*h* may be grouped for application of an exterior base coat layer to the body 200, e.g., to interior and exterior surfaces of a motor vehicle.

The specific groupings discussed herein may be convenient, as the robots grouped together for a given coating layer are generally disposed adjacent one another in the longitudinal direction, e.g., direction 103, of the paint booth 110*a*. While these groupings may be convenient from the standpoint of applying a particular layer of paint to the body 200 in a single region of the paint booth 100*a*, any other grouping of the robots 102 for application of one or more layers of paint may be employed that is convenient.

Various coatings that are applied to the vehicle may advantageously have a reduced flash time, the flash time including a predetermined period of time after which a coating is applied prior to a follow on coating. As flash times are reduce by paint manufactures it is understood that the dimensions of the exemplary paint booth 100 may be reduced.

Turning now to FIG. 1B, the operation of the robots will be described in further detail. While the robots 102 have been generally described as application robots capable of spraying or applying a coating material, e.g., a primer or base coat of paint, to an object, the robots may also be configured to perform other tasks that may be necessary during application of a coating material to the vehicle. For example, the robots 102 may each be configured to manipulate closure panels, e.g., doors, a hood, or a decklid, of a vehicle between open and closed positions with respect to the vehicle. This configuration advantageously allows robots 102 to perform functions other than applying a desired coating material, such additional functions being opening and closing closure panels of the vehicle to allow application of the coating material to all surfaces of the vehicle. Robots 102 may be provided with a feature allowing the robot 102 to grasp a portion of the closure panel. For example, as seen in FIG. 1B, a hook 110 may be provided on the robot wrist to allow a robot 102*k* to open and close a hood (or door, or truck deck) of vehicle 200 as desired. By providing coating robot with the ability to open and close portions of the vehicle it is possible to reduce costs as fewer robots are needed.

Figure 1C:
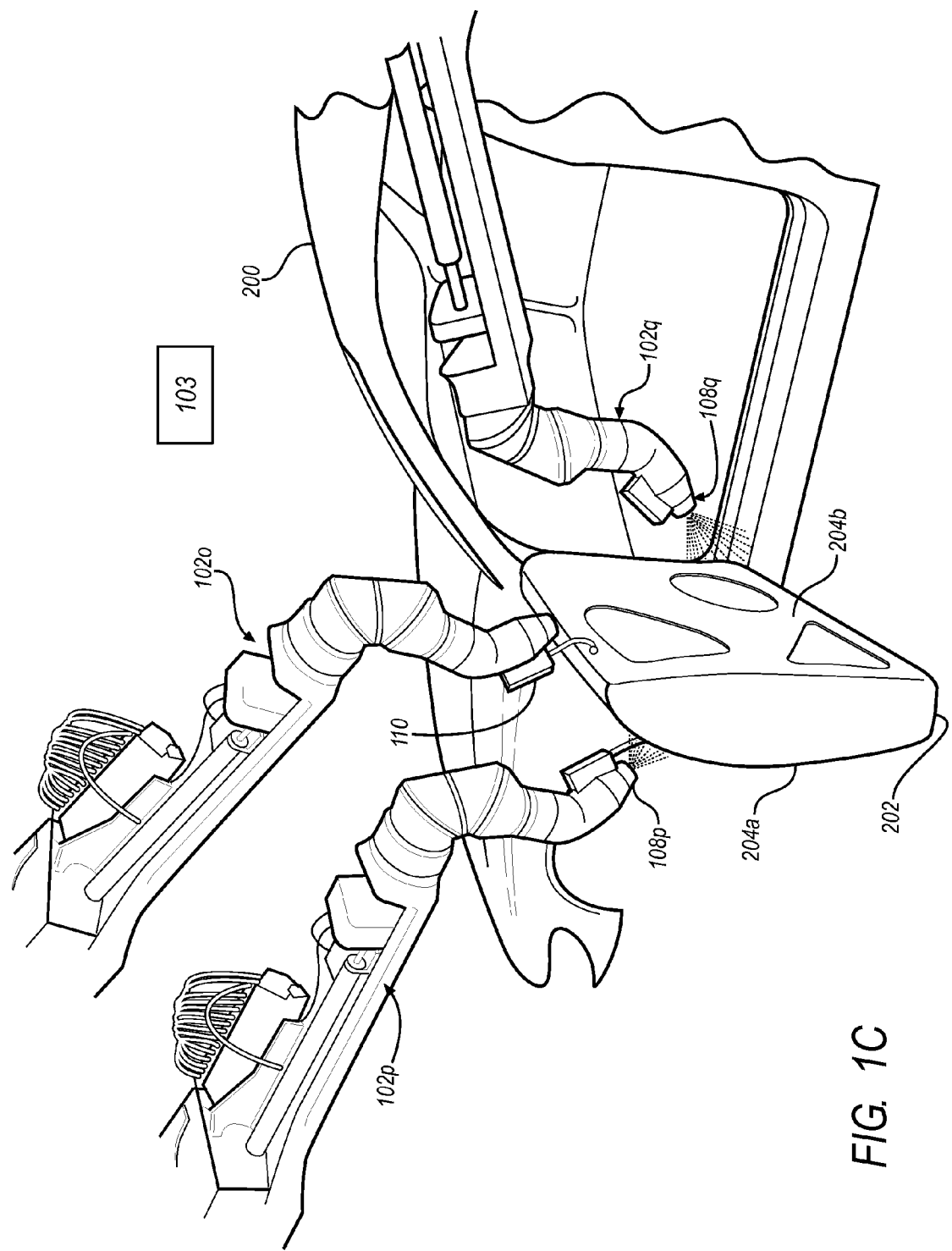
FIG. 1C is an isometric view of another exemplary coating installation.

As briefly described above, the paint booth 100 is generally configured to apply a coating material to various portions of the vehicle 200. FIG. 1C is an exemplary drawing of robots 102 simultaneously applying a coating material to exterior and interior surfaces of vehicle body 200. The exterior coating may be applied to an outer surface 204a of a door panel 202 of vehicle body 200 by a robot 102p while an interior coating robot 102q may apply an interior coating layer to an inside surface 204b of the door panel 202. A robot 102o may generally manipulate the door 202 relative to the vehicle body 200, e.g., by opening and closing the door 202 to allow painting of the interior and exterior surfaces 204a, 204b of the door 202. After robots 102p and 102q have applied a first coating to an object, e.g., door 202, third and fourth robots may be configured to simultaneously apply respective second paint layers to the interior and exterior surfaces of the portion of the object that directly overlap one another.

As the robots 102p and 102q may generally apply a wet coating material to the door 202 generally simultaneously in some examples, it may be necessary to provide a device for preventing contact between door and body surfaces while each are still wet. For example, a door clip (not shown) may be provided that generally spaces apart the door (or any other closure panel) from the body after the door is moved back to its closed position. In one known example, a door clip engages striker features of the door and body, thereby spacing them apart while not contacting visible components of the door or body.

As best seen in FIG. 1A, the paint booth may further include a scrubber 300, i.e., a paint application waste disposal area, that is in communication with each of the application robots 102 within the booth 100a. Paint waste from each of the robots 102 is carried away by the paint application waste disposal 300. The paint application waste disposal or scrubber 300 defines a predetermined length encompassing each of the application robots 102. In other words, each of the application robots 102 are generally contained within a single paint booth 100a, where the length of the booth 100a may generally be defined by the longitudinal extent of the scrubber or waste disposal system 300 that services the robots 102 of the paint booth 100a.

Various features and methodologies described herein generally permit the provision of exterior and interior coating robots within a single paint booth 100, as generally illustrated in the exemplary booths of FIGS. 1A, 1B, and 1C.

Figure 1D:
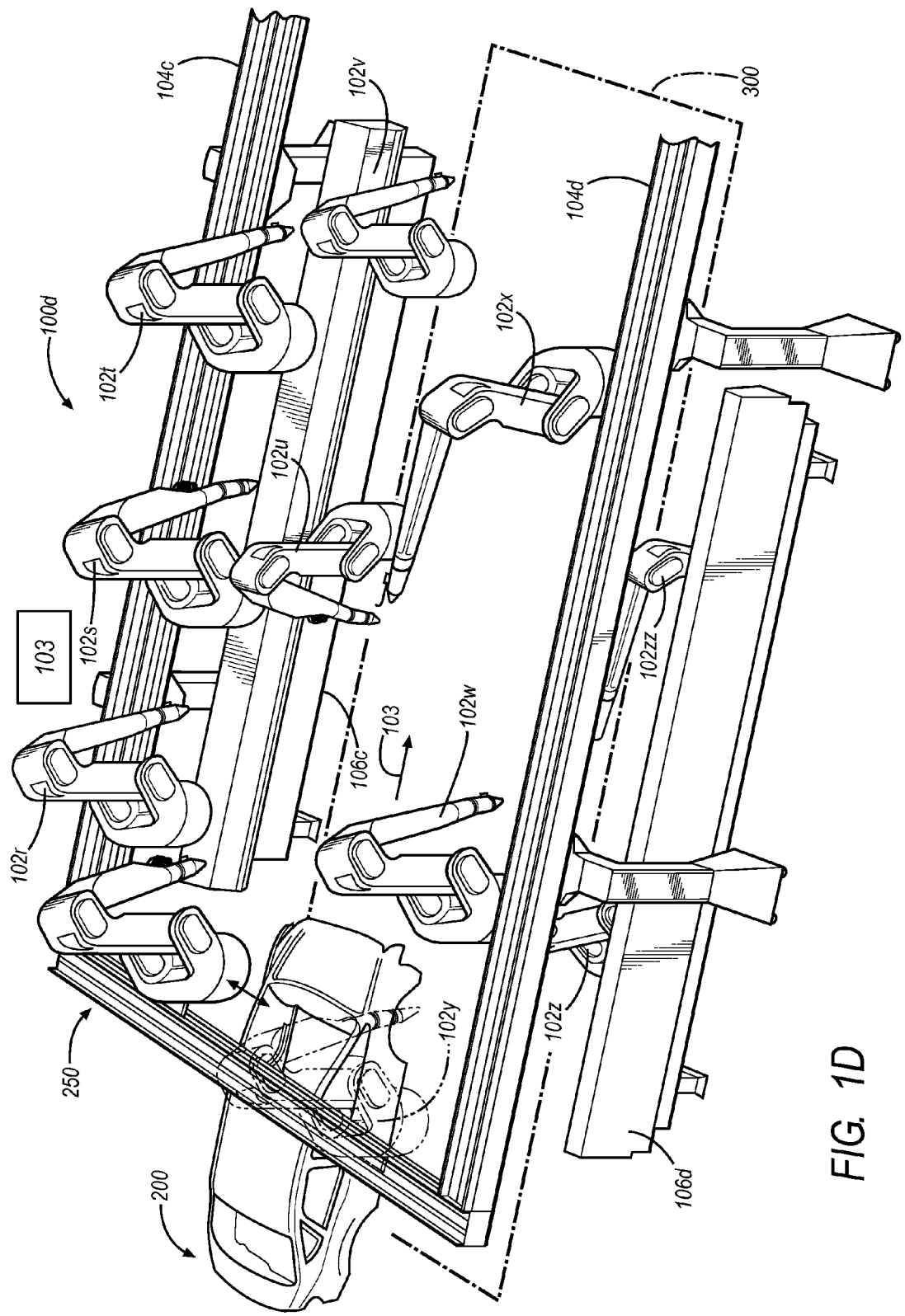
FIG. 1D is an isometric view of another exemplary coating installation.

As shown in FIG. 1D, transverse rails may also be provided for even greater flexibility of applying a coating layer. For example, a lateral rail 250 extending horizontally across a paint booth 100d may be provided that supports an additional robot 102y. Further, an additional lateral rail (not shown) may be provided at an end of the booth 100d longitudinally opposite the end at which the lateral rail 250 is provided. This may add two additional robots at both the point where the vehicle body 200 enters the paint both and where the vehicle body 200 exits the paint booth. By providing additional coating robots it is possible to apply additional coating layers in an even more compressed footprint. In such an example, it may be that robot 102y is involved with a primer coat and other robots, within the same paint booth performing other coating operations, for example base coat and clear coat painting operations. As shown in FIG. 1D, the example having one or more transverse rails may also include upper and lower rails 104, 106, respectively, that support additional robots 102.

Figure 2:
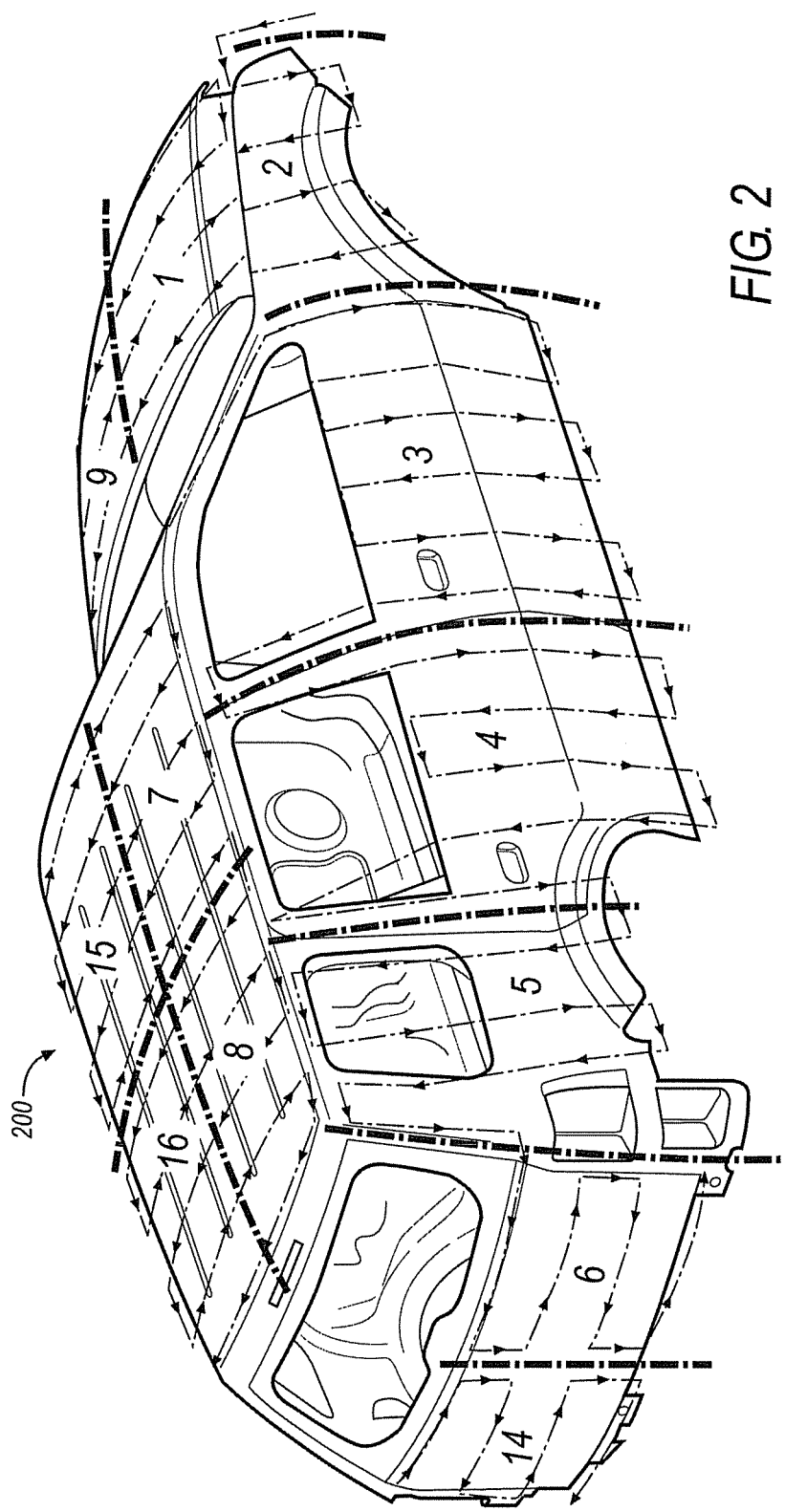
FIG. 2 is an isometric view of a vehicle body for coating within an exemplary coating installation, the vehicle body including a plurality of application zones.
Figure 5:
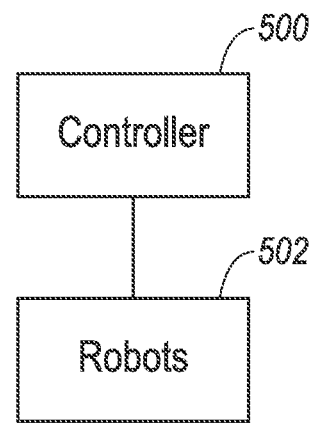
FIG. 5 is a diagram of an exemplary process for controlling robots by a controller.

Turning now to FIG. 2, a vehicle 200 is shown having various exterior application zones 1, 2, 3, 4, 5, 6, 7, 8, 9, 10, 11, 12, 13, 14, 15, and 16. Arrows 20 represent the path of a coating robot along the surface of vehicle 200 with the path being defined by a set of computer instructions available to the coating robot assigned to apply a coating to any given zone. Each of the zones 1-16 represents an area of exterior layer application that is assigned to one of the robots 102 within the booth 100. Coating application zones for interior portions of vehicle body 200 may be likewise provided albeit not shown in FIG. 2. For example, as referenced above in regard to FIG. 1A, different robots may simultaneously coat different parts of the vehicle including simultaneous application of coating materials to both internal and external surfaces. In the exemplary embodiment the computer instructions associated with each zone may be available to every robot in the painting booth. As described below by making the instructions available to all robots the coating system of the exemplary embodiment may provide a method to continue painting operations in the event that a robot fails.

It should be noted that zones 1-16 are much smaller than is traditional. For example, the six horizontal zones 1, 7, 8, 9 15, and 16 may be divided into two zones in the prior art, a left zone and a right zone. By dividing the horizontal surfaces into smaller sections additional robots may be able to work to apply a coating to vehicle 200. While it is therefore beneficial to reduce the size of assigned zones in order to allow greater flexibility of the robots 102, this may also be influenced by overall size and complexity of an object being coated or painted. Therefore a particular size of the zones 1-16 may be influenced not only by a desire for greater flexibility of robot tasks, but also by an overall size of a vehicle and surface complexity.

Turning now to FIG. 3, a process 301 for coating an object in a coating installation is illustrated. Process 301 may generally begin at 302, where a first paint layer, for example a primer, is applied to both the interior and exterior surfaces of a vehicle body with a first group of robots. In certain applications separate primer materials may be applied to the interior and exterior surfaces of a vehicle body. Process 301 then proceeds to 304. At 304, a second paint layer, for example a base coat is applied to the interior and exterior surfaces of a vehicle body with a second group of robots As described above, the exemplary paint booth 100 generally allows application of both an interior and an exterior paint layer within a single paint booth 100. Further process 304 may occur relative to a first vehicle body while process 302 occurs with respect to a second vehicle body within a single paint booth 100. Alternatively, the first and second layers may be applied one after the other, in any order that is convenient.

At process 306, paint application waste may be carried away from the first and second application robots via a paint application waste disposal. The paint application waste disposal may define a predetermined length encompassing each of the first and second application robots and may occur at any time. It is contemplated that the predetermined length of the scrubber may be as little as 45 feet in some applications as a result of providing all interior and exterior robots within a single booth 100a. Process 301 may then terminate.

Turning now to FIG. 4, an exemplary process for degrading a coating installation is described. Degrading a coating installation generally includes reassignment of robots with various application and handling tasks associated with a coating operation due to a partial or complete malfunction of at least one of the application and/or opener robots. For example, where an application robot requires service, becomes inoperable, or is otherwise unavailable for applying a coating material, manipulating a closure panel of a vehicle, or performing some other task assigned to it during normal operation, it will be necessary for another robot to perform the task. If multiple robots become unavailable further reassignment may be necessary. Further, it may be necessary to reorganize other application tasks amongst the remaining robots in order to continue the painting operation using only the robots. This may be referred to as a "lights out" application, that is, entirely without manual intervention.

Generally, exemplary degrade processes follow a hierarchy of assigning robot tasks according to various factors. In select applications, but not all applications, at least one extra or "degrade" robot may be provided within a paint booth. For example as seen above in FIG. 1A robot 102g may be assigned normal painting tasks or may in other circumstances be assigned more of a complete or partial stand by mode and act as the degrade robot 102g. The degrade robot may pick up the task previously performed by the malfunctioning robot, or tasks may be reassigned amongst other robots including the previously idle degrade robot.

Generally, the reassignment of robot tasks follows a hierarchy or priority scheme. For example, a task, such as applying a particular coating layer to a given portion of a vehicle, may be assigned to another robot based upon the proximity of the other available robot to the disabled robot. For this reason, if a degrade robot is provided, it may be convenient to locate a degrade robot, e.g., degrade robot 102g, generally within a middle portion of a paint booth. Furthermore, any robot 102 specifically designated as a degrade robot may have a maximum level of task flexibility, e.g., the degrade robot 102g can apply different materials, handle different closure panels of the vehicle, etc., thereby allowing the degrade robot 102g to step in to perform the tasks of a maximum number of other robots. The reassignment of robot tasks may also involve shuffling of tasks amongst available robots. For example, where the degrade robot is inconveniently located with respect to a malfunctioning robot, such that the degrade robot would not adequately be able to perform the malfunctioning robot's task, it may be more convenient to reassign the malfunctioning robot's task to a third robot that is functioning properly, and then reassigning the third robot's task to the degrade robot. Accordingly, all tasks continue operation in a "lights out" fashion, such that no manual application is needed.

Furthermore, while examples are provided herein regarding a degrade robot where initially the degrade robot, e.g., robot 102g, is completely idle, degrade robots need not necessarily be entirely idle initially or during normal operation. For example, any robot that is not being used to its full capacity during normal operation may function as a degrade robot and pick up additional tasks as necessary.

Nonetheless, if and when a second robot malfunctions, it may become necessary to degrade the application further and further reassign robots to accomplish coating operations. Providing an increased number of painting zones and making the computer instructions associated with each zone available to all robots within the paint booth facilitates a robust degrade operation within a compact footprint. As a matter of priority the tasks involving the most amount of manual work may be determined and given priority within a degrade hierarchy. for example, exterior panels will require much higher quality as a result of the high visibility to the customer, and therefore require significant attention to detail and minimizing disruptions and thus if an exterior operation fails it may receive top priority. Another factor may be that interior portions of a vehicle having multiple surface undulations or features, e.g., an engine compartment, will require a greater amount of work to apply a coating layer than, for example, an interior coating layer of a body interior. Thus, painting of an engine compartment will be prioritized over a door jam. In this way, if any manual intervention is necessary it will be of the least important features. In other embodiments line speed associated with vehicle 200 may be decreased, or as described above even stopped entirely for a period of time, to allow the remaining robots to complete all painting operations without manual intervention. In cases where manual intervention is desired or necessary, i.e., where the enough robots 102 have malfunctioned such that remaining robots cannot pick up all of the tasks assigned to the malfunctioning robots, it may be advantageous to assign lowest priority tasks to the manual spraying devices. For example, where a task assigned to a malfunctioning robot includes surfaces that are generally smooth and undulating, or are not in areas of a vehicle often visible to a potential customer, these tasks will be assigned to a manual spraying device when necessary before tasks associated with more complex or visible features.

Additionally, in examples where a first degrade robot 102 is not fully idle during normal operation, i.e., the degrade robot 102 performs at least some task, there may be greater potential for requiring use of a manual sprayer when other robots malfunction. Greater utilization rates associated with a degrade robot during normal operation may therefore be tolerated by accepting greater potential for needed manual intervention, as a degrade robot may in these cases be less available to pick up additional tasks from malfunctioning robots. Conversely, lower utilization rates initially associated with a degrade robot, e.g., robot 102g, may allow greater flexibility to pick up tasks from other robots 102 that are malfunctioning, thereby decreasing the potential need for manual intervention when one or more robots malfunction. Further, a degrade robot having a lower initial utilization rate will necessarily be capable of picking up a greater number of tasks, even performing tasks of more than one robot in some cases.

Maintaining a "lights out" operation for a given painting operation, i.e., without any manual sprayer, may even be possible by taking other measures to allow greater utilization of the robots 102. For example, a given line speed, i.e., a rate of motion of a conveyor associated with a paint booth 100, manual intervention may be required more often than if the line speed is simply lowered, thereby allowing a longer time period for robots 102 to collectively complete the assigned tasks. Further, a line speed may be entirely stopped during a particular painting operation, thereby allowing completion of the collective tasks by the robots 102, and avoiding a need for assignment of any of the robot tasks to a manual spraying device.

Process 400 may generally begin at 402, where a plurality of robots are provided for applying a coating material to an object moving through the coating installation. Further, the robots are configured to move closure panels of the object relative to the object. For example, as described above a plurality of robots 102 may be provided in a booth 100a, where the robots 102 may each perform a series of handling and application tasks in order to apply a coating material. Process 400 may then proceed to 404.

At 404, process 400 queries whether a malfunction has been detected for one of the robots. A malfunction may generally prevent a given robot from performing a first assigned task. If a robot malfunctions it will typically return to a home position where collisions will be minimized. For example, a coating application controller 500 may detect that one of the robots 102 can no longer apply paint because its paint lines will not clear or otherwise requires service or replacement, or any other situation where a robot cannot perform its assigned task adequately. Where a malfunction is not detected, process 400 then proceeds to 406, where normal operation of the coating application continues, then returning to 404 for continual monitoring. Where a malfunction is detected at 404, process 400 proceeds to 408.

At 408, the malfunctioning robot is identified. For example, a controller 500 of the coating installation may identify that a particular robot 102 has become disabled on an associated rail along which the robot 102 moves. Process 400 then proceeds to 410.

At 410, the position and last painting function of the malfunctioning robot position is identified. For example, a controller 500 of the coating installation may determine where along path 20 the robot has ceased painting operations, and how that location has become adjusted as vehicle body 200 continues to advance through the paint booth. Process 400 may then proceed to 412.

At 412, a second one of the robots is selected to perform the first assigned task, e.g., based upon a degrade priority scheme. The degrade priority scheme may select the second one of the robots based upon a proximity of the second robot to the first robot as well as the task currently assigned to the second one of the robots. Alternatively or in addition, the degrade priority scheme may select the second one of the robots based upon a proximity of an idle one of the robots, i.e., a degrade robot, to the first (malfunctioning) robot. The second robot that is selected may be the idle (i.e., degrade) robot, or alternatively may be another functioning robot, for example where the degrade robot is inconveniently positioned with respect to the task needed to be performed. The second robot may thus initially be performing another task, e.g., closing/opening closure panels of the vehicle, applying a coating material, or any other task needing to be performed as part of the application process. The provision of dual-capability robots, i.e., robots that are capable of applying a coating material and also of opening/closing the closure panels of the vehicle, as described above, may be especially advantageous in this respect, as robots may be freely reassigned tasks with maximum flexibility. Further, in some cases it may be necessary to assign tasks to a manual spraying device where there is not enough remaining capacity amongst the robots 102 to pick up all of the tasks assigned to one or more malfunctioning robot 102. In making a determination of what task to assign to a manual spraying device, a task currently assigned to a robot being considered for taking over the task of the malfunctioning robot(s) may be compared with the task(s) of the malfunctioning robot, or other robots being considered to take over the task of the malfunctioning robot, in order to determine which task is a lowest priority task that may be re-assigned to a manual application device. Process 400 then proceeds to 414.

At 414, a new path is determined for the second available robot that is taking over for the malfunctioning robot. This path will allow the substitute robot to travel to the last known location of painting operation and pick up where the painting operations previously ceased. This new path may precisely match the location of the last known painting operation or may operate to an approximation. For example, where the malfunctioning robot is disabled from movement, it may be necessary for the robot taking over the task of the malfunctioning robot to avoid the disabled robot, while still completing the task of the malfunctioning robot. In another example, a particular module being coated when a given robot malfunctions may be entirely re-applied by a robot taking over for the malfunctioning robot. Thus, instead of merely finishing a module or area of a vehicle left incomplete as a result of a malfunctioning robot, a robot taking over the task may entirely re-do the module, thereby minimizing potential coating imperfections that might otherwise result from an interrupted coating operation. A controller 500 of the coating installation may generally take into account the location of the malfunctioning robot, e.g., as determined at 410, and adjust a path associated with the task now being performed by the available robot accordingly. Process 400 may then proceed to 416.

At 416, the coating operation may continue. In one example, the controller 500 reassigns an available robot to complete any uncompleted portions of the task of a malfunctioning robot. The available robot(s) thus may continue a coating operation of a vehicle even where another robot becomes disabled during the specific coating task it is initially assigned. For example, the controller 500 may assign the task of the disabled robot to an available robot, thereby allowing the available robot to take over where the disabled robot left off and finishing the coating operation of the vehicle. Further, as described above an available robot may completely re-do a particular task left partially completed by a malfunctioning robot.

Alternatively, 416 may include a command from the controller 500 of the coating operation to simply reassign the task of the malfunctioning robot to an available robot, continuing the coating operation on the next subsequent vehicle moving through the paint booth.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A paint booth for applying paint to a vehicle, the vehicle including interior and exterior surfaces, the vehicle moving through the paint booth along a conveyor, the conveyor defining a path, the paint booth comprising:

first and second robot rails positioned parallel to the path of the conveyor;

at least first and second robots positioned on at least one of the rails, the first robot positioned to apply paint to an interior surface of a portion of the vehicle, and the second robot positioned to apply paint to an exterior surface of the portion of the vehicle, the first and second robots configured to simultaneously apply respective first paint layers to the interior and exterior surfaces of the portion on a same side of the vehicle; where said interior surface is on a side of the portion that directly overlaps the exterior surface and said portion is moveable between open and closed positions while remaining attached to the vehicle; and at least third and fourth robots positioned on at least one of the rails, the third robot positioned to apply paint to the interior surface of the portion of the vehicle and the fourth robot positioned to apply point to the exterior surface of the portion of the vehicle, the third and fourth robots configured to simultaneously apply respective second paint layers to the interior and exterior surfaces of the portion on a same side of the vehicle where said interior surface is on a side of the portion that directly overlaps the exterior surface and said portion is moveable between open and closed positions while remaining attached to the vehicle.

2. The paint booth of claim 1, further comprising third and fourth rails, wherein the first through fourth rails are positioned in lower and upper positions on opposite sides of the conveyor.

3. The paint booth of claim 2, further comprising a fifth rail extending in said direction generally perpendicular to the conveyor and at least one robot positioned on the fifth rail.

4. The paint booth of claim 3, wherein the robot positioned on the fifth rail is configured to apply a third paint layer to the object.

5. The paint booth of claim 1, wherein said first and second robots are further configured to open and close a door on the object.

6. The paint booth of claim 1, wherein the first paint layer includes a first one of a primer coat, a base coat, and a clear coat, and the second paint layer includes a different one of the primer coat, the base coat, and the clear coat.

7. The paint booth of claim 6, further comprising a scrubber for disposing of paint application waste, the scrubber extending a predetermined length along the path defined by the conveyor, wherein the first, second, third, and fourth robots are positioned along the predetermined length.

8. The paint booth of claim 1, further comprising a controller configured to detect a malfunction in one of the robots, wherein the malfunction prevents the robot from performing an assignment associated with the one of the robots, the controller configured to identify the assignment of the one of the robots, the controller configured to select a remaining robot to perform the assignment previously assigned to the one of the robots detected to be malfunctioning based upon at least a relative priority of the assignments that the robots have.

9. A paint booth for applying paint to a vehicle, the vehicle including interior and exterior surfaces, the vehicle moving through the paint booth along a conveyor, the conveyor defining a path, the paint booth comprising:

first and second robot rails positioned parallel to the path of the conveyor;

at least first and second robots positioned on at least one of the rails, the first robot positioned to apply paint to an interior surface of the vehicle and the second robot configured to apply paint to an exterior surface of the vehicle, the first and second robots configured to simultaneously apply respective first paint layers to the interior and exterior surfaces on a same side of the vehicle; wherein said exterior surface and interior surface are located on a portion of the vehicle, said interior surface is on a first side of the portion that directly overlaps a second side of the portion where the exterior surface is located and said portion is moveable to an open position while remaining attached to the vehicle; and at least third and fourth robots positioned on at least one of the rails, the third robot positioned to apply paint to the interior surface of the vehicle and the fourth robot positioned to apply paint to the exterior surface of the vehicle, the third and fourth robots configured to simultaneously apply respective second paint layers to the interior and exterior surfaces on a same side of the vehicle;

wherein said interior and exterior surfaces of the vehicle directly oppose one another and face away in opposite directions from each other and so that the portion of the vehicle receives simultaneously on directly overlapping surfaces when the portion is the open position.

10. The paint booth of claim 9, further comprising third and fourth rails, wherein the first through fourth rails are positioned in lower and upper positions on opposite sides of the conveyor.

11. The paint booth of claim 9, wherein said first and second robots are further configured to open and close a door on the object.

12. The paint booth of claim 9, wherein the first paint layers include a first one of a primer coat, a base coat, and a clear coat, the second paint layers include a second one of the primer coat, the base coat, and the clear coat, and the third paint layer includes the remaining one of the primer coat, the base coat, and the clear coat.

13. The paint booth of claim 12, further comprising a scrubber for disposing of paint application waste, the scrubber extending a predetermined length along the path defined by the conveyor, wherein the first, second, third, and fourth robots are positioned along the predetermined length.

14. The paint booth of claim 9, further comprising a scrubber for disposing of paint application waste, the scrubber extending a predetermined length along the path defined by the conveyor, wherein the first, second, third, and fourth robots are positioned along the predetermined length.

15. The paint booth of claim 9, further comprising a controller configured to detect a malfunction in one of the robots, wherein the malfunction prevents the robot from performing an assignment associated with the one of the robots, the controller configured to identify the assignment of the one of the robots, the controller configured to select one of the remaining robots to perform the assignment previously assigned to the robot detected to be malfunctioning based upon at least a relative priority of the assignments that the robots have.

16. The paint booth of claim 9, further comprising a fifth robot configured to apply a third paint layer to the object.

17. The paint booth of claim 16, further comprising a fifth rail extending in said direction generally perpendicular to the conveyor, wherein the fifth robot is positioned on the fifth rail.

18. A paint booth for applying paint to a vehicle, the vehicle including interior and exterior surfaces, the vehicle moving through the paint booth along a conveyor, the conveyor defining a path, the paint booth comprising:

first and second robot rails positioned parallel to the path of the conveyor;

at least first and second robots positioned on at least one of the rails, the first robot positioned to apply paint to an interior surface of a portion of the vehicle and the second robot positioned to apply paint to an exterior surface of the vehicle that directly overlaps the interior surface of the portion of the object, the first and second robots configured to simultaneously apply respective first paint layers to the interior and exterior surfaces of the portion of the vehicle on a same side of the vehicle that directly overlap one another; and, said interior surface is located on a first side of the portion that directly overlaps a second side of the portion where the exterior surface is located and said portion is moveable to an open position while remaining attached to the vehicle; and at least third and fourth robots positioned on at least one of the rails, the third robot positioned to apply paint to the interior surface of the portion of the vehicle and the fourth robot positioned to apply paint to the exterior surface of the portion of the vehicle, the third and fourth robots configured to simultaneously apply respective second paint layers to the interior and exterior surfaces of the portion of the vehicle that directly overlap one another;

a controller configured to detect a malfunctioning robots, wherein a malfunction prevents the malfunctioning robot from performing an assignment associated with the one of the robots, the controller configured to identify the assignment of the robots, the controller configured to select a remaining robot to perform the assignment previously assigned to the malfunctioning robot based upon at least a relative priority of assignments that the robots have.

19. The paint booth of claim 18, wherein the relative priority is that exterior surfaces are preferred over interior surfaces.

* * * * *